US009809340B1

(12) United States Patent
Chang

(10) Patent No.: US 9,809,340 B1
(45) Date of Patent: Nov. 7, 2017

(54) RECHARGEABLE SEALER WITH STORAGE FUNCTION

(71) Applicant: Welcome Co., Ltd., New Taipei (TW)

(72) Inventor: Richard Chang, New Taipei (TW)

(73) Assignee: WELCOME CO., LTD., New Taipei (TW)

( * ) Notice: Subject to any disclaimer, the term of this patent is extended or adjusted under 35 U.S.C. 154(b) by 0 days.

(21) Appl. No.: 15/448,625

(22) Filed: Mar. 3, 2017

(51) Int. Cl.
| | | |
|---|---|---|
| *B32B 37/00* | (2006.01) | |
| *B65B 51/22* | (2006.01) | |
| *H01M 10/0525* | (2010.01) | |
| *H01M 10/44* | (2006.01) | |
| *H02J 7/00* | (2006.01) | |

(52) U.S. Cl.
CPC ......... *B65B 51/22* (2013.01); *H01M 10/0525* (2013.01); *H01M 10/44* (2013.01); *H02J 7/0052* (2013.01)

(58) Field of Classification Search
CPC ... B65B 51/22; H01M 10/0525; H01M 10/44; H02J 7/0052
USPC ..................................................... 156/583.1
See application file for complete search history.

(56) References Cited

U.S. PATENT DOCUMENTS

| | | | | |
|---|---|---|---|---|
| 5,272,303 A | * | 12/1993 | Shioiri | B29C 65/04 156/380.4 |
| 6,998,577 B2 | * | 2/2006 | Chou | B29C 66/225 156/229 |
| 7,939,783 B2 | * | 5/2011 | Chang | B26B 27/00 156/579 |

* cited by examiner

*Primary Examiner* — James Sells
(74) *Attorney, Agent, or Firm* — Bacon & Thomas, PLLC

(57) ABSTRACT

A rechargeable sealer with storage function includes a casing, an electric heating module, a circuit board, a supporting base, a press bar, a spring-back mechanism, and a sliding plate. The casing is provided with an accommodating chamber, in which are provided with a fore contact element and a rear contact element. A rechargeable battery is positioned in and between the fore contact element and the rear contact element. The circuit board, provided with an external slot, is disposed in the accommodating chamber, featured in charging the rechargeable battery. The press bar is provided with a sliding slot, and is pivotally connected with the pivoting shaft of the supporting base, served as a pressing structure corresponding to the casing.

7 Claims, 4 Drawing Sheets

RECHARGEABLE SEALER WITH STORAGE FUNCTION

BACKGROUND OF THE INVENTION

Field of the Invention

The present invention relates to a rechargeable sealer with storage function, and more particularly, to a rechargeable sealer with storage function adapted for sealing plastic bags or plastic sheets.

Description of Related Art

Compact and portable sealers have long since been available in the market, and currently manufacturers have put efforts for improvement, such as the one disclosed in Taiwan Utility Model Publication No. M394289, entitled "Improved Structure for Electric Sealer." Referring to FIG. 5, a perspective view illustrating a conventional rechargeable electric sealer, the electric sealer 9 comprises a casing 92, a main supporting base 951 engaged with the casing 92, a front supporting base 952, a rear supporting base 953, and a press bar 97 pivotally connected with the casing 92. A pivoting expansion module 96 is arranged underneath the casing 92, where the expansion module 96 relates to a blade assembly. Further, the electric sealer 9 accommodates batteries for providing electric energy, such that during pressing down the press bar 97, an electric heating module 93 will convert electric energy into thermal energy so as to perform a sealing action.

However, the conventional electric sealer, after being used, maintains a gap between the press bar 97 and the casing 92, namely the press bar 97 cannot have its body accommodated entirely in the casing 92, leaving a huge volume. This also exposes the electric heating module 93, making it possible that a user may actuate the electric heating module 93 by accident and so be burnt, let alone energy wastes. Besides, suppose during a process of mass production, every single sealer can reduce its volume, expenses on transportation and storage can be decreased. Further, the conventional art adopting a design in loading disposable batteries not only lowers durability, but also increases a concern on environmental pollution.

Given the above, in an attempt to solve the problem, as mentioned above, research and experiments for a "Rechargeable Sealer with Storage Function" have been undertaken, eventually resulting in accomplishment of the present invention.

SUMMARY OF THE INVENTION

An object of the present invention is to provide a rechargeable sealer with storage function, featured in that an improved sliding mechanism can change the sealer into a state of storage after a user has finished using the sealer. In addition, the sealer comprises a built-in circuit board and an external slot so as to proceed with charging and discharging repeatedly for rechargeable batteries. This will not only eliminate waste of disposable batteries effectively, but also reduce environment pollution.

To achieve the above-mentioned object, the rechargeable sealer with storage function comprises a casing, an electric heating module, a circuit board, a supporting base, a press bar, a spring-back mechanism, and a sliding plate. The casing is provided with an accommodating chamber, in which are provided with a fore contact element and a rear contact element. A rechargeable battery is positioned in and between the fore contact element and the rear contact element. The electric heating module is received in the accommodating chamber, and is connected with the fore contact element. The circuit board, provided with an external slot, is disposed in the accommodating chamber, and is connected with the rear contact element, served as a connecting route for the rechargeable battery and an external power supply. The supporting base includes at least a receiving slot, and a pivoting shaft, and is fastened and secured to the casing. The press bar is provided with a sliding slot, and is pivotally connected with the pivoting shaft of the supporting base, served as a pressing structure corresponding to the casing. The spring-back mechanism is received in the accommodating chamber for biasing against underneath of the press bar. The sliding plate is provided with a heat-resisting insulator and a stopper, such that the sliding plate can move along the sliding slot. As such, the rechargeable sealer, according to the present invention, not only makes the overall appearance of the sealer look like a cuboid through changing the position of the sliding mechanism; but also through the charging unit such as the built-in circuit board, a regular replacement of internal batteries is unnecessary, so that the purpose of environmental protection and durability can be achieved.

According to the present invention, the rechargeable battery relates to a lithium battery featured in having a larger output power, no memory effect, and higher frequency of repeated charging and discharging. As such, the lithium batteries, which apply broadly on consumer electronic products, can also fit to the rechargeable sealer with storage function, according to the present invention.

Further, according to the present invention, the external slot may relate to a USB slot for connecting with a corresponding USB plug, such that the USB plug can be connected to a computer or a power supply so as to provide a voltage of 5 volts as a source of energy for the rechargeable sealer, according to the present invention.

According to the present invention, the electric heating module may include a heat insulative base, an electric heating portion, and a single-point contact, wherein the electric heating portion is disposed on the heat insulative base, and the single-point contact is electrically connected with the electric heating portion and the fore contact element. As such, the electric heating module can convert the electric power of the rechargeable battery into thermal energy and output the same.

Further, according to the present invention, the spring-back mechanism may simply relate to an elastic element or a safety switch. The elastic element includes a press pillar and a spring, wherein the spring is received in the accommodating chamber, and biases against and between the press pillar and the casing. The press pillar passes through a through hole of the supporting base. The safety switch may include electronic components, or components of equivalent effects, where the safety switch can limit the electric heating mechanism to be in an off-position prior to pressing down the spring-back mechanism.

Still further, according to the present invention, the casing is provided, underneath, with a magnet, for attaching the rechargeable sealer on the magnetically surface of furniture. As such, the rechargeable sealer, according to the present invention, can be attached to a refrigerator door or other conspicuous positions, rather than just laying in a drawer or in a storage box. This will enhance convenience of the sealer.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
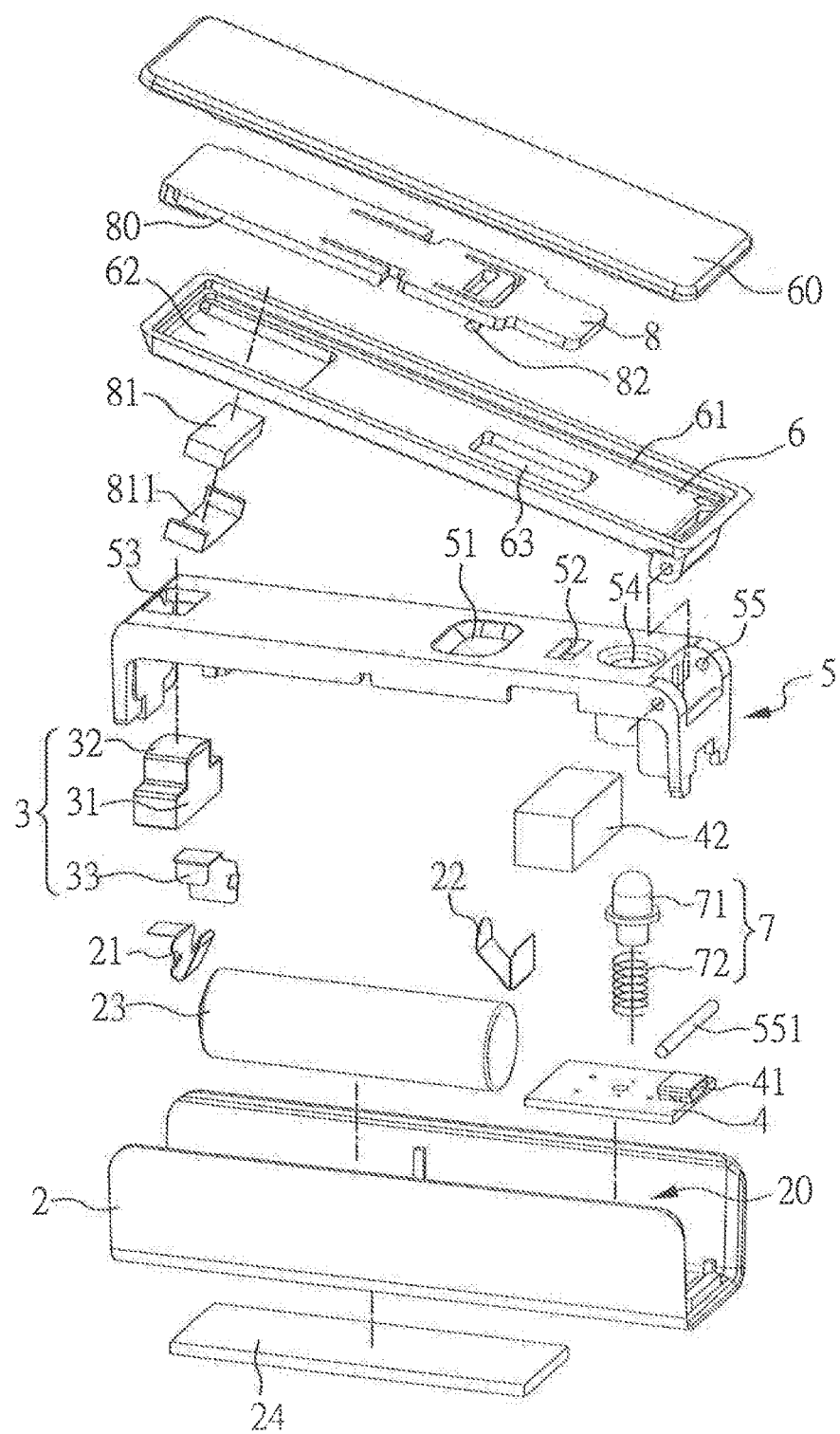
FIG. 1 is an exploded view illustrating a rechargeable sealer with storage function according to the present invention.
Figure 2:
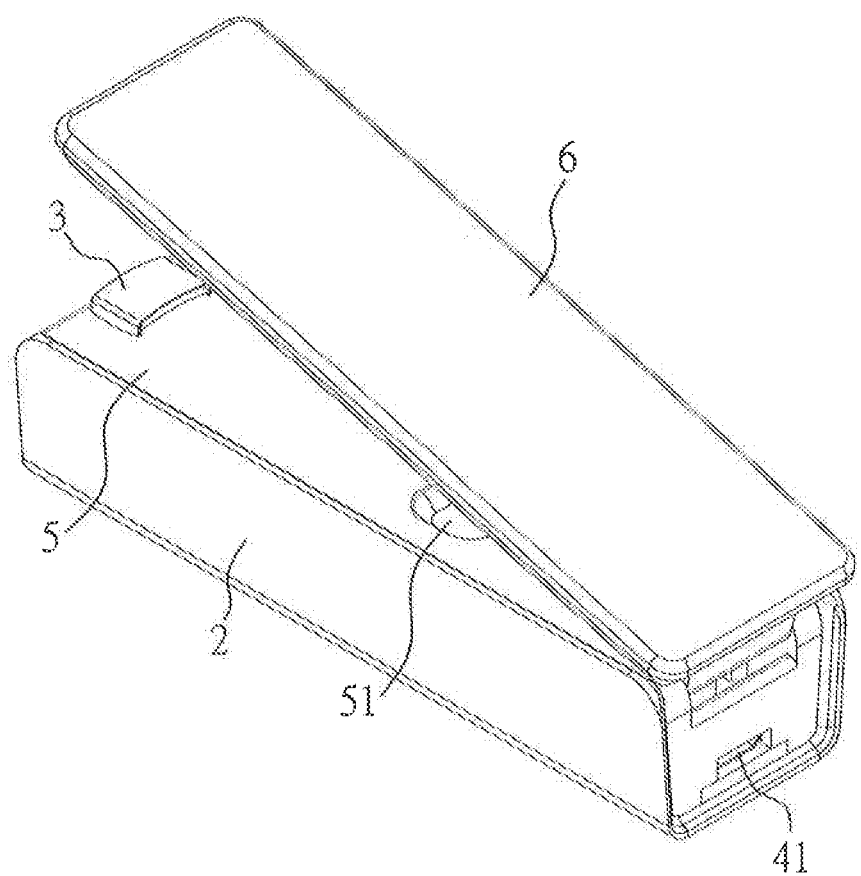
FIG. 2 is a perspective view illustrating the rechargeable sealer with storage function according to the present invention.

Referring to FIG. 1, an exploded view illustrating a rechargeable sealer with storage function according to the present invention; and to FIG. 2, a perspective view illustrating the rechargeable sealer with storage function, the rechargeable sealer with storage function comprises a casing 2, an electric heating module 3, a circuit board 4, a supporting base 5, a press bar 6, a spring-back mechanism 7, and a sliding plate 8.

As shown in FIG. 1, the casing 2 is provided, underneath, with a magnet 24 (according to the present invention, the magnet 24 relates to a rubber magnet), for attaching the rechargeable sealer on the magnetically surface of furniture. The casing 2 is also provided with an accommodating chamber 20, in which are provided with a plurality of slots (not shown) for securing a fore contact element 21, a rear contact element 22, and a spring 72 of the spring-back mechanism 7. A rechargeable battery 23 (according to the present invention, the rechargeable battery 23 relates to a lithium battery) is positioned in and between the fore contact element 21 and the rear contact element 22 so as to establish a loop, and to output the power of the rechargeable battery 23 received in the accommodating chamber 20. In addition, the rechargeable battery 23 is electrically connected with the circuit board 4, and that a cement resistance 42 is disposed in and between the rear contact element 22 and the circuit board 4 so as to achieve the purpose of lowering voltage and temperature. The circuit board 4 is provided with an external slot 41 having a form of USB for connecting with a corresponding USB plug, such that the USB plug can be connected to a computer or a power supply so as to provide a voltage of 5 volts as a source of energy for recharge.

According to the present invention, the electric heating module 3 includes a heat insulative base 31, an electric heating portion 32, and a single-point contact 33, wherein the electric heating portion 32 is disposed on the heat insulative base 31. A heating wire (not shown) is disposed on an upper surface of the heat insulative base 31, and is electrically connected with the fore contact element 21, where the single-point contact 33 is electrically connected with the electric heating portion 32 and the fore contact element 21. As such, the rechargeable sealer with storage function, according to the present invention, in a loop of electric power, can introduce electric power of the rechargeable battery 23 to the heating wire, making the electric heating portion 32 intensively collect heat energy so as to provide a heat of high temperature for the purpose of sealing.

Further, according to the present invention, the spring-back mechanism 7 includes a press pillar 71 and the spring 72, wherein the spring 72 is secured in the slot of the casing 2, and biases against and between the press pillar 71 and the casing 2 so as to provide a restoring force against underneath of the press bar 6. This will allow the press bar 6 to recover (pivot) to a certain distance automatically, after a user has finished a single sealing action, and to be ready for a next sealing action. In addition, the spring-back mechanism 7 can serve as a safety switch, namely, in order to activate the loop of voltage so as to heat the heating wire, the user must press the electric heating portion 32 of the electric heating module 3 and the press pillar 71 of the spring-back mechanism 7 simultaneously. This will greatly reduce the possibility of scald due to actuating the electric heating module 3 inadvertently.

As shown in FIG. 1, the supporting base 5 relates to an integrally-made structure; or on the other hand, to a separately-made structure with components combined together. The supporting base 5 is provided for protecting and securing the components disposed in the rechargeable sealer, and includes a first receiving slot 51, a second receiving slot 52, a first through hole 53, a second through hole 54, and a pivotable element 55, where the supporting base 5 is fastened and secured to the casing 2. The heat insulative base 31 has a protrusion passing through the first through hole 53; whereas the press pillar 71 has an upper edge passing through the second through hole 54. A pivoting shaft 551 is inserted into the pivotable element 55 so as to serve as a pivoting center for the pivoting of the press bar 6. The rechargeable sealer with storage function, according to the present invention, has a merit in not necessary to open the supporting base 5 to replace a battery during actual manufacturing, because of the use of the rechargeable battery 23. Namely, a normal sealing with glue, between the casing 2 and the supporting base 5, makes the structure of the sealer more solid and durable, and even for the appearance of the sealer, a simple and clear style can thus be obtained.

Now, as shown in FIG. 1 and FIG. 2, the press bar 6, pivotally connected with the pivoting shaft 551 of the supporting base 5, is arranged with an ornamental sheet 60, and is provided with a sliding slot 61, a first sliding hole 62, and a second sliding slot 63. The sliding plate 8 is fixedly arranged with a heat-resisting insulator 81, where a heat-resisting insulative cover sheet 811 is disposed on an upper surface of the heat-resisting insulator 81 so as to serve an extra protecting means. The heat-resisting insulative cover sheet 811, according to the present invention, relates to a Teflon™ tape. The sliding plate 8, with its two sides 80, slides along the sliding slot 61 of the press bar 6, such that the sliding plate 8 can move forward or backward along the sliding slot 61 so as to selectively adjust to a state of use or a state of storage. According to the present invention, in addition to fixedly arranging the heat-resisting insulator 81, a stopper 82 is provided therewith. The stopper 82 is limited to be within a boring area of the second sliding slot 63, such that the user can move, with a finger, the stopper 82 to change, in two stages, the positions of the sliding plate 8. This is primary for the purpose that the relative position between the heat-resisting insulator 81, which passes through the first sliding hole 62, and the heat insulative base 31 can be adjusted. In contrast, the first receiving slot 51 and the second receiving slot 52 of the supporting base 5 are provided for receiving the stopper 82 when pressing down the press bar 6, such that no matter in the state of use or in the state of storage, the stopper 82 can be prevented from impacting the supporting base 5 so as to eliminate the possibility of obstructing the work of sealing or storage.

Figure 3:
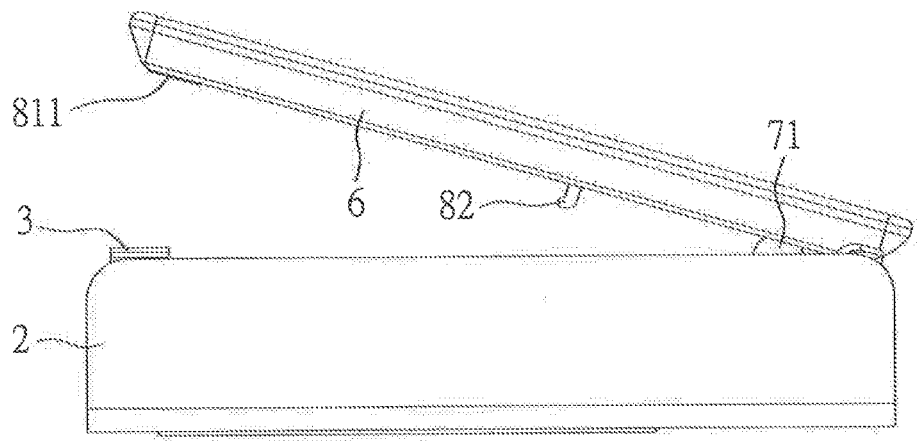
FIG. 3 is a side view illustrating the rechargeable sealer with storage function according to the present invention in a state of use.
Figure 4:
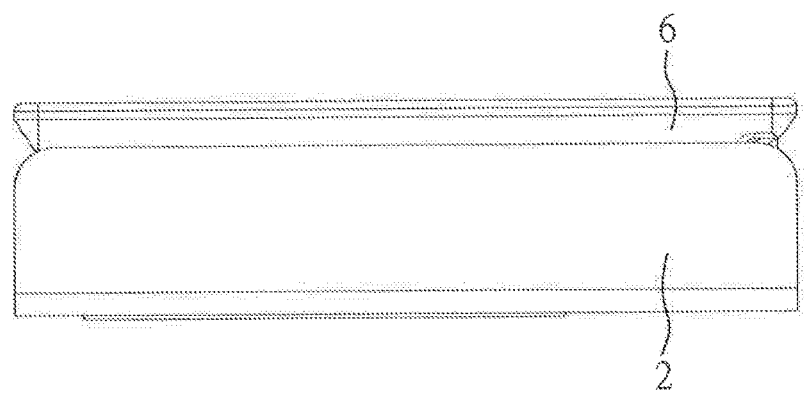
FIG. 4 is a side view illustrating the rechargeable sealer with storage function according to the present invention in a state of storage.
Figure 5:
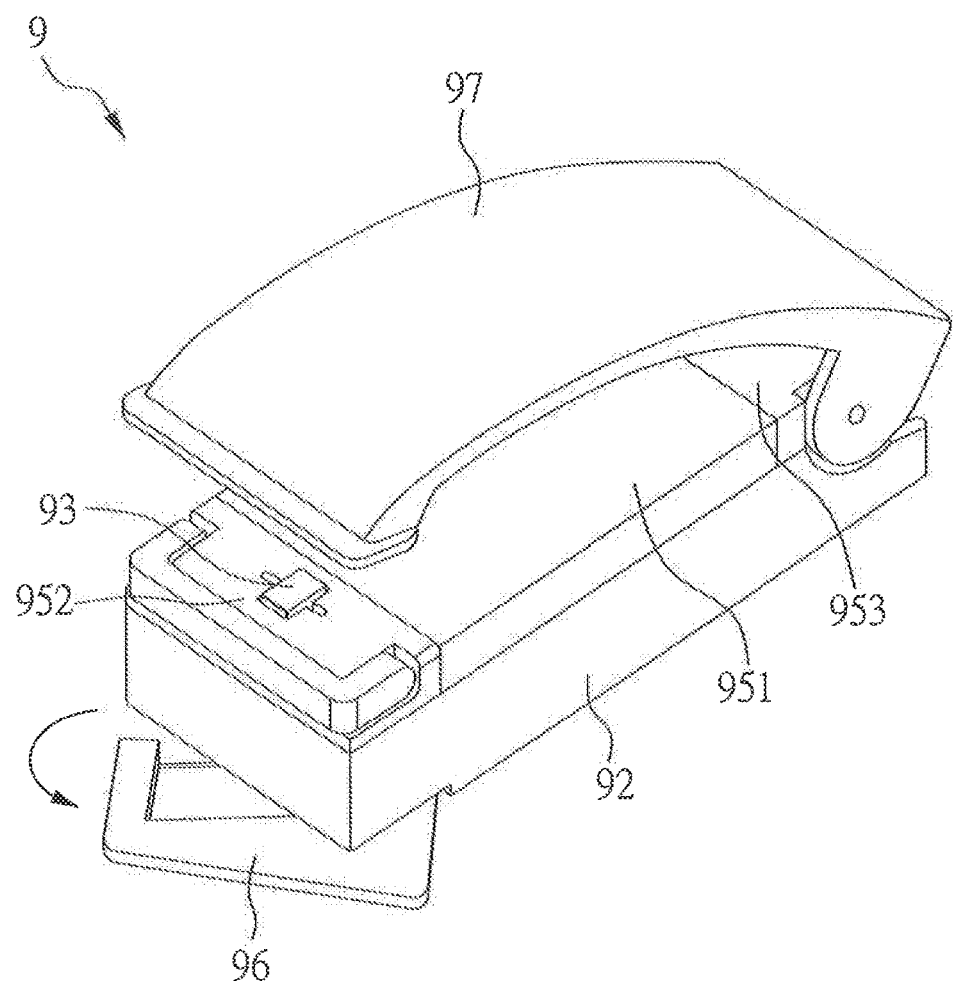
FIG. 5 is a perspective view illustrating a conventional rechargeable sealer.

Further, references are made to FIG. 3, a side view illustrating the rechargeable sealer with storage function according to the present invention in a state of use; and FIG. 4, a side view illustrating the rechargeable sealer with storage function in a state of storage. As shown in FIG. 3, in a state of use for the sealer, the sliding plate 8 is moved to an actuating position, namely the sliding plate 8 moves frontward, such that the heat-resisting insulator 81 corresponds to the underneath heat insulative base 31, and the stopper 82 to the underneath first receiving slot 51. In contrast, as shown in FIG. 4, in a state of storage for the sealer, the sliding plate 8 is moved to an engaging position, namely the sliding plate 8 moves backward, such that the heat-resisting insulator 81 is away from the underneath heat insulative base 31, and the stopper 82 corresponds to the underneath second receiving slot 52. In addition, the stopper 82 has an engaging structure for being engaged with the second receiving slot 52. This will make the press bar 6 seal the casing 2 and the overall appearance of the sealer look like a cuboid, reducing the volume of the sealer effectively and achieving the purpose of storage.

Although the present invention has been explained in relation to its preferred embodiments, it is to be understood that many other possible modifications and variations can be made without departing from the scope of the invention as hereinafter claimed.

What is claimed is:

1. A rechargeable sealer with storage function, comprising:
   a casing, provided with an accommodating chamber, in which are provided with a fore contact element and a rear contact element, and a rechargeable battery is positioned in and between the fore contact element and the rear contact element;
   an electric heating module, received in the accommodating chamber, and connected with the fore contact element;
   a circuit board, provided with an external slot, and disposed in the accommodating chamber, and connected with the rear contact element;
   a supporting base, including at least a receiving slot, and a pivoting shaft, and fastened and secured to the casing;
   a press bar, provided with a sliding slot, and pivotally connected with the pivoting shaft of the supporting base;
   a spring-back mechanism, received in the accommodating chamber for biasing against underneath of the press bar; and
   a sliding plate, provided with a heat-resisting insulator and a stopper, such that the sliding plate can move along a sliding slot.

2. The rechargeable sealer with storage function as claimed in claim 1, wherein the rechargeable battery relates to a lithium battery.

3. The rechargeable sealer with storage function as claimed in claim 1, wherein the external slot relates to a USB slot.

4. The rechargeable sealer with storage function as claimed in claim 1, wherein the electric heating module includes a heat insulative base, an electric heating portion, and a single-point contact.

5. The rechargeable sealer with storage function as claimed in claim 1, wherein the spring-back mechanism relates to an elastic element.

6. The rechargeable sealer with storage function as claimed in claim 1, wherein the spring-back mechanism is expanded to a safety switch, such that in order to activate a heating function, the electric heating module and the spring-back mechanism must be pressed simultaneously.

7. The rechargeable sealer with storage function as claimed in claim 1, wherein the casing is provided, underneath, with a magnet, for attaching the rechargeable sealer on the magnetically surface of furniture.

* * * * *